US005237732A

United States Patent [19]

Polak et al.

[11] Patent Number: 5,237,732

[45] Date of Patent: Aug. 24, 1993

[54] METHOD FOR ADJUSTING THE SIZE OF HANGING FILE FRAMES TO FIT INTO A DESIRED DRAWER OF A DESK OR CABINET

[75] Inventors: Donald J. Polak, Brentwood; Kenneth E. McDonald, Columbia, both of Tenn.

[73] Assignee: Pelikan, Inc., Franklin, Tenn.

[21] Appl. No.: 865,370

[22] Filed: Apr. 8, 1992

[51] Int. Cl.[5] .......................... B26F 3/02; B23P 17/00

[52] U.S. Cl. ........................................ 29/413; 29/525; 225/2; 225/89

[58] Field of Search ..................... 211/46, 45, 11, 183, 211/182; 312/184; 248/225.4; 403/347; 29/413, 414, 417, 426.4, 426.5, 525; 225/2, 89, 93, 94

[56] References Cited

U.S. PATENT DOCUMENTS

| | | |
|---|---|---|
| 3,999,663 | 12/1976 | Walter et al. . |
| 4,091,933 | 5/1978 | Alexander . |
| 4,526,277 | 7/1985 | Snowden et al. . |
| 4,601,398 | 7/1986 | Solomon . |
| 4,662,553 | 5/1987 | Grosjean . |
| 4,858,665 | 8/1989 | Miller et al. . |

*Primary Examiner*—Timothy V. Eley
*Attorney, Agent, or Firm*—John F. A. Earley; John F. A. Earley, III

[57] ABSTRACT

A hand-held breaker tool for adjusting the length of the side rails of frames that support hanging file folders in a drawer. The tool is used to break off an unwanted excess length portion of the side rails A method of adjusting and assembling a frame for holding and supporting hanging file folders and inserting the frame into a drawer of a desk or file cabinet.

4 Claims, 4 Drawing Sheets

METHOD FOR ADJUSTING THE SIZE OF HANGING FILE FRAMES TO FIT INTO A DESIRED DRAWER OF A DESK OR CABINET

BACKGROUND OF THE INVENTION

1. Field of the Invention

The present invention relates to a hand-held breaker tool for adjusting the length of a frame for supporting hanging file folders to fit in a drawer of a desk or cabinet, a method of adjusting the length of the frame to fit into the drawer, and a method of adjusting the length of and assembling the frame for holding hanging file folders in the drawer.

2. Description of the Prior Art

Hanging file folders for drawers of desks or cabinets are in common use today and the file folders comprise two reinforced top edge members with hooks extending outwardly therefrom which hook over side rails of a hanging folder frame support, and a web extending between the top edge members which holds papers in the file folder. The hanging folders stay upright instead of sagging below the top portions of a horizontal stack of files and disappearing from sight like with conventional file folders. The hooks extending from the reinforced top edge members of the hanging file folders hold the folder in position on a hanging file support frame, and also slide easily along side rails of the hanging file support frame so that the hanging file folders may be easily pushed back and forth to insert a file folder into the drawer or withdraw a file folder from the drawer. An example of a hanging file support frame is shown in U.S. Pat. No. 4,526,277 which issued on Jul. 2, 1985, and in Canadian Patent No. 1,198,764 which issued Dec. 31, 1985. Both patents issued to Corvent International Limited, and both patents are incorporated herein by reference.

It is conventional today to provide hanging file support frames as a kit in knock-down condition with side rails of a standard size which may be too long for insertion into the customer's desk drawer or filing cabinet draw. It is also conventional to provide the side rails with a series of crimps or score lines which are lines of weakness, so that the customer can and adjust the length of the side rails to fit a drawer by breaking-off an unwanted end portion of the side rail at a crimp line of weakness.

However, one of the problems encountered by a customer trying to put the support frame together is that he must find a way to break the side support rails at the proper length. This is not always easy to do, especially if the customer does not have any tools. Even if the customer does have an assortment of tools available, it is sometimes difficult to break the rail at the desired crimp line. In some cases, a customer has resorted to sawing the rail at the crimp line, which is difficult.

SUMMARY OF THE INVENTION

To overcome the problems involved in tailoring and adjusting the length of the frame and its side support rails, this invention contemplates supplying the end user with a breaker tool to assist in "breaking", or flexing until fatigued, the side rails at the proper length. The breaker tool comprises a handle portion and a head portion having a transverse slot. In the method of using the breaker tool, the end user puts the unwanted portion of the side support rail into the transverse slot to a desired score line, and then flexes the unwanted end portion of the side rail back and forth with the tool until the rail breaks at the crimp line.

DETAILED DESCRIPTION OF THE DRAWINGS

Figure 1:
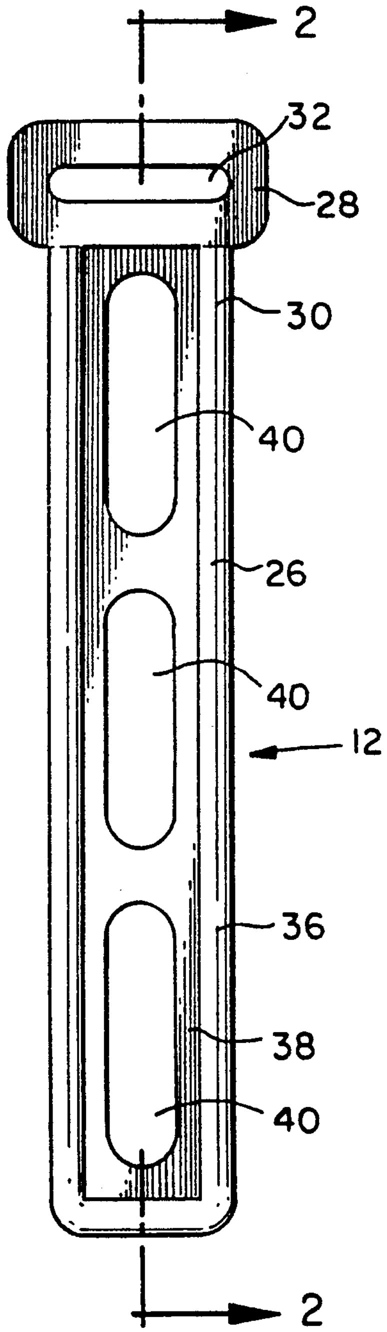
FIG. 1 is a view in front elevation of a breaker tool constructed in accordance with this invention.

Turning now to the drawings, there is shown a hand-held breaker tool 12 for adjusting the length of the side rails 14 of frames 16 that support hanging file folders 18 in a drawer 20 by breaking off an unwanted excess length portion 22 of the side rails 14.

The side rails 14 are provided with a series of spaced-apart vertical crimp lines 24 of weakness along end portion 22 of the side rail 14.

Breaker tool 12 has a longitudinal handle portion 26, and a head portion 28 integral with handle portion 26 and positioned at one end 30 of the handle portion 26. A transverse slot 32 is formed in the head portion 28.

When a side rail 14 of a frame 16 for supporting hanging file folders 18 is inserted into the transverse slot 32 adjacent a crimp line 24, and the unwanted excess end portion 22 of the side rail 14 is subjected to bending back and forth about the crimp line 24, the side rail 14 breaks off at the crimp line 24 to adjust the length of the remaining side rail 14 to the proper size to fit into a desired drawer of a desk or of a file cabinet.

The method of adjusting the length of a side rail 14 of a frame 16 that supports hanging file folders 18, with the side rail 14 having a series of spaced-apart vertical crimp lines 24 of weakness spaced along an end portion 22 of the side rail 14, comprises providing a hand-held breaker tool 12 which has a longitudinal handle portion 26, a head portion 28 integral with the handle portion 26 positioned at one end of the handle portion 26, and a transverse slot 32 formed in the head portion 28. The unwanted end portion 22 of the side rail 14 is inserted into the transverse slot 32 of the breaker tool 12 until the slot 32 is adjacent to the vertical crimp line 24 that is to form the desired end of the rail 14. The wanted portion 34 of the side rail 14 is held still, and the breaker tool 12 is manipulated to bend the unwanted end portion 22 of the rail 14 back and forth about the crimp line 24 until the rail 14 breaks at the crimp line 24. The unwanted portion 22 of the rail 14 is discarded, and the wanted portion 34 of the rail 14 is used in assembling the frame 16 which is inserted into the drawer 20 to hold the hanging file folders 18.

Figure 4:
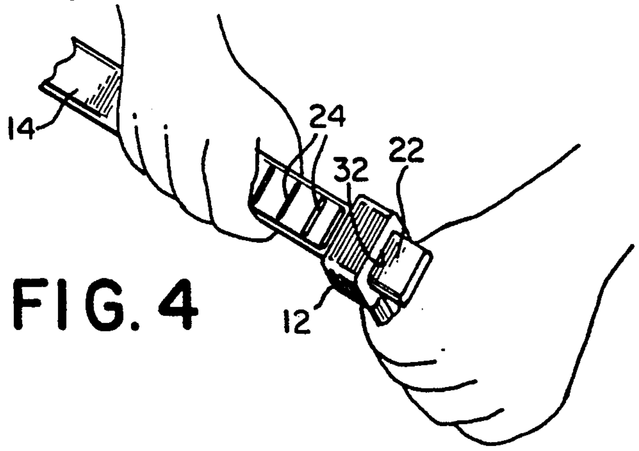
FIG. 4 is a view in perspective showing a breaker tool in break position with a portion of a side rail of a hanging folder frame inserted therein.

FIG. 4 illustrates the method whereby the wanted portion 343 of the rail 14 is held in the hand of the user in a fixed position, and the bending of the unwanted excess length portion 22 is accomplished by manipulating the breaker tool 12 to bend the unwanted excess length portion 22 back and forth about the crimp line adjacent to it.

Figure 2:
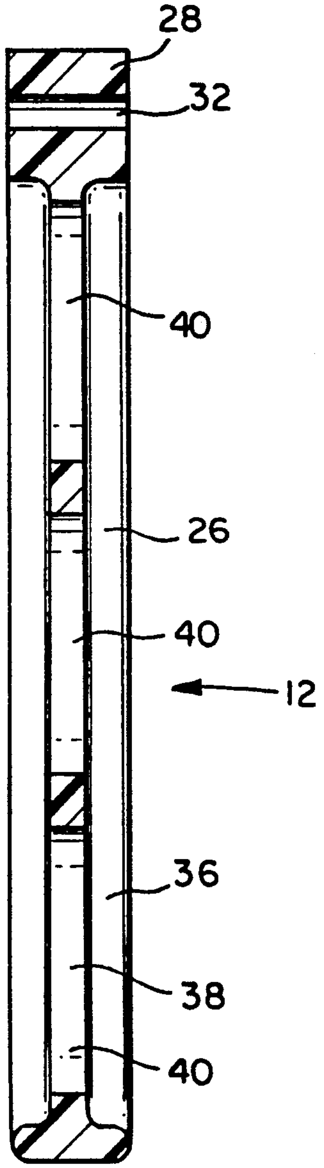
FIG. 2 is a view in vertical section of the breaker tool taken as indicated by the lines and arrows 2—2 which appear in FIG. 1.
Figure 5:
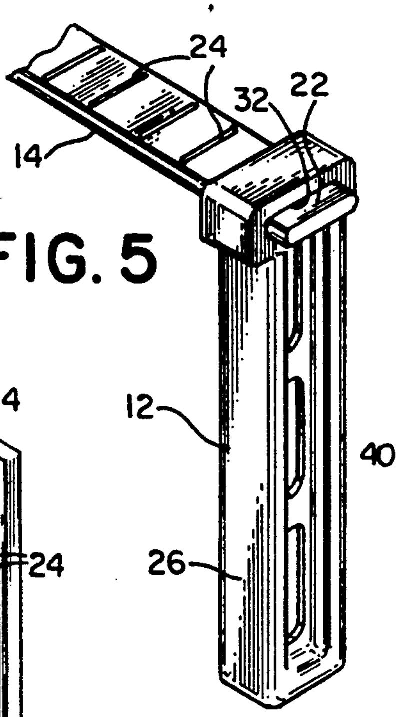
FIG. 5 is another view showing the breaker tool with a portion of a side rail inserted therein.
Figure 3:
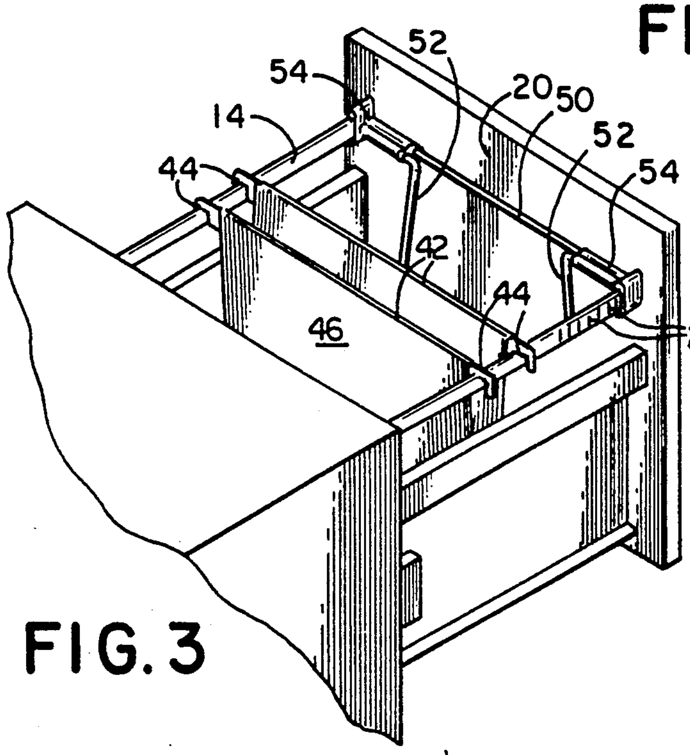
FIG. 3 is a view in perspective illustrating a hanging file frame supporting a hanging file folder in a desk drawer.

FIGS. 1 and 2 show the breaker tool 12 in greater detail. Handle portion 26 has a thicker border portion 36 that surrounds a thinner central portion 38 which has three longitudinal openings 40. FIG. 2 also illustrates the depth of transverse slot 32.

Figure 6:
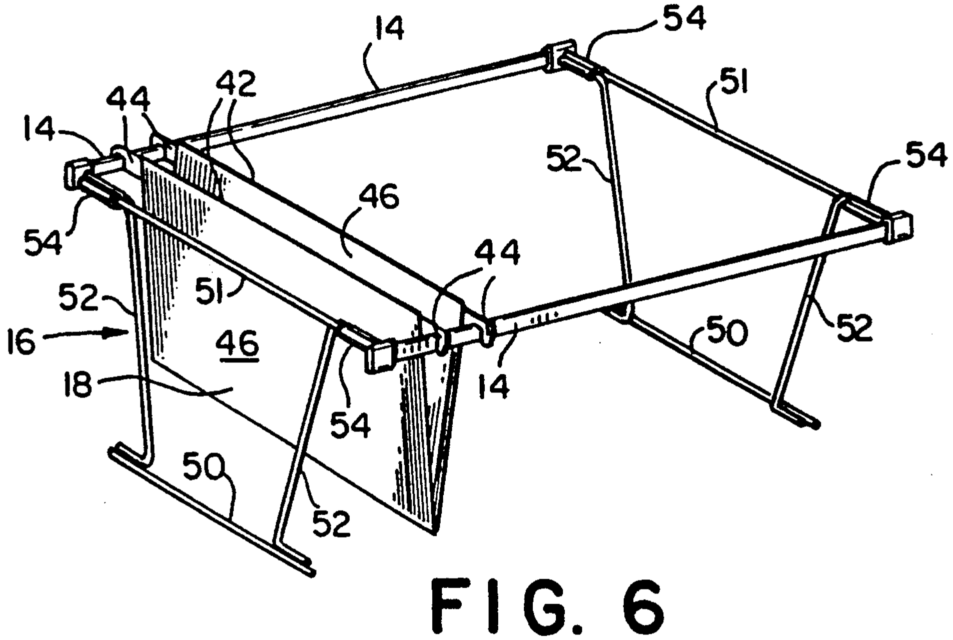
FIG. 6 is a view in perspective of a hanging file frame showing a hanging file folder supported on the frame.

FIG. 6 shows the frame 16 in assembled condition with a hanging file folder 18 supported by the side rails 14. Hanging files 18 have a pair of reinforced upper support edge members 42 with hooks 44 extending from each side of edge members 42, and a web 46 extending from one edge member to the other. The hooks 44 are supported by the side rails 14 and the hooks are easily slidable along the side rails 44 to hold the file folders 18 upright so that you can see the top of the file folders 18 and any identification that appears thereon.

FIGS. 7 through 11 illustrate the steps in the assembly operation of the frame 16 after the rails 14 have been broken off to proper length.

Figure 7:
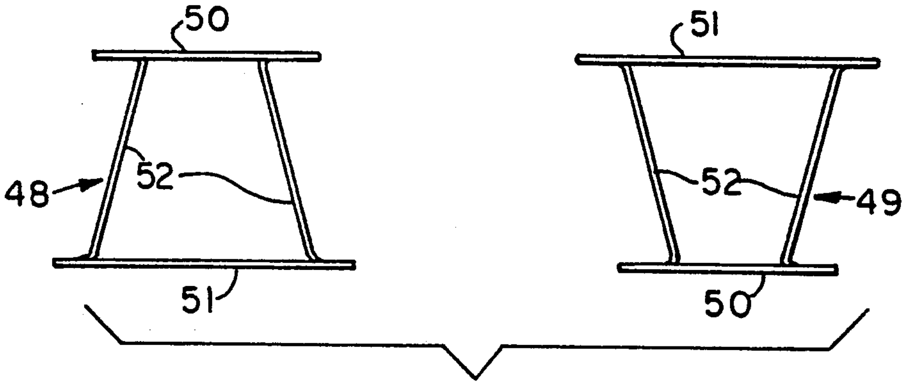
FIG. 7 is a view in elevation of individual end frame support members, with the left hand end frame support member having its shorter end frame horizontal member on top to accommodate letter-size hanging folders, and with the right hand end frame support member its longer horizontal member on top to accommodate legal-size hanging folders.

FIG. 7 shows an elevation view of two end frame members 48,49 of the frame 16 with end frame member 48 having its shorter horizontal member 50 up and end frame member 49 having its longer horizontal member 51 up. Horizontal members 50 are connected to horizontal members 51 by a pair of vertical side wires 52. You select letter or legal size by simply reversing the position of the horizontal members.

Figure 8:
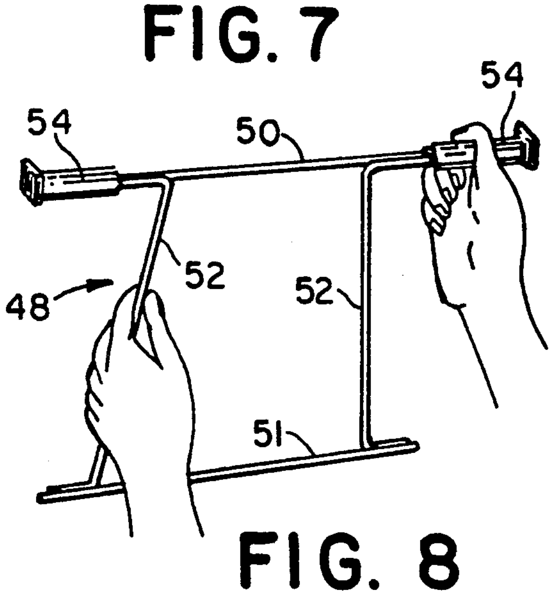
FIG. 8 shows a view in elevation of an end frame support member and illustrates the step of attaching plastic corner posts to the ends of the top horizontal member.

FIG. 8 shows putting one plastic corner post 54 on each end of the upper horizontal member 51, with slot 56 in plastic corner post 54 being positioned so that it faces you as you are assembling the frame 16.

Figure 9:
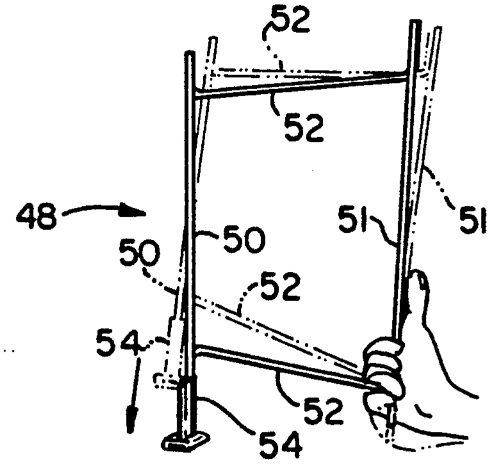
FIG. 9 shows the next step which comprises tapping each of the plastic corner posts on the floor to ensure that they are on the top horizontal member as far as they will go.

FIG. 9 illustrates the step of gently tapping each of the four corner posts 54 on the floor to insure that they are on the horizontal member 51 as far as they go.

Figure 10:
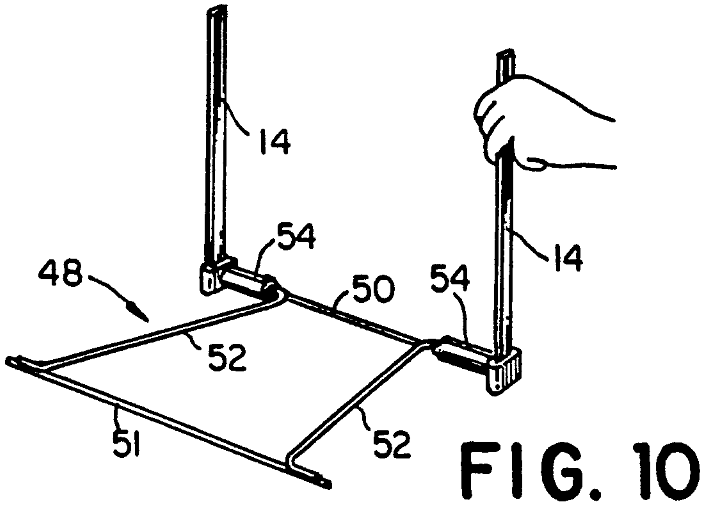
FIG. 10 illustrates the next step in the method of assembly comprising pushing each of two side rails into the plastic corner posts of one of the end frame support members.

FIG. 10 illustrates the step of placing one of the end frame members 48 on a flat surface and pushing each of the two side rails 14 into the slots in its plastic corner posts 54 as far as they go.

Figure 11:
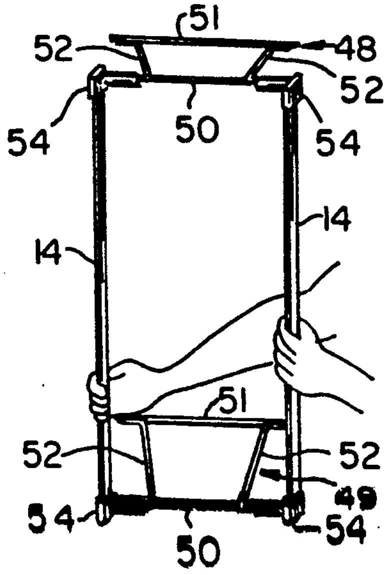
FIG. 11 shows the next step in the method of assembly of the hanging file frame which comprises placing the other end section on a flat surface and pushing the opposite ends of the side rails into the corner posts.

FIG. 11 shows the step of placing the other end frame member 49 on a flat surface and pushing the opposite end of the side rails 14 into the slots 56 in the corner posts 54.

And that's all there is to it, the frame 16 is assembled and ready to be inserted into a drawer and support hanging file folders 18.

ADVANTAGES

The frame 16 of the present invention and its breaker tool 12 have the advantage of eliminating the need for using a vise or pliers to break off the unwanted portion 22 of side rails 14. The customer, uses just the breaker tool 12 to assemble the frame 16, and does not have to look around for a pair of pliers to break rails 14, or for a saw to saw off the unwanted end portion 22. This solves a problem for customers who buy the frame kit and do not have a tool to break off the unwanted portion 22 of rails 14 to fit the file frame into their desk drawer.

We claim:

1. A method of adjusting the length of side rails of a frame that supports hanging file folders in a drawer, and adjusting the length of the side rail by retaining a wanted portion of the rail and breaking off an unwanted portion of the rail with a hand-held breaker tool, said side rail having a series of spaced-apart vertical crimp lines of weakness spaced along an end portion of the side rail, comprising providing a breaker tool,
   said breaker tool having a longitudinal handle portion, a head portion integral with the handle portion and positioned at one end of the handle portion, and a transverse slot formed in the head portion,
   inserting the unwanted end portion of a side rail into the transverse slot of the breaker tool until the slot is adjacent to a vertical crimp line that is to form a desired end of the rail,
   holding the wanted portion of the side rail still,
   manipulating the breaker tool to bend the unwanted end portion of the rail back and forth about the crimp line until the rail breaks at the crimp line,
   and discarding the unwanted portion of the rail which has broken off from the wanted portion of the rail.

2. A method of adjusting the size of a hanging file frame for insertion into a drawer to support hanging file folders, comprising
   providing a hand-held breaker tool having a longitudinal handle portion, a head portion integral with the handle portion and positioned at one end of the handle portion, and a transverse slot formed in the head portion,
   providing a side rail having a cross section,
   said transverse slot in the head portion of the breaker tool being larger than the cross section of the rail,
   adjusting the length of the rail by retaining a wanted portion of the rail and breaking off an unwanted portion of the rail,
   breaking off the unwanted end portion of the rail by inserting the unwanted end portion of the rail into the transverse slot in the breaker tool,
   positioning the transverse slot just outwardly of a desired crimp line of weakness that is to be the end of the rail when it is adjusted as to length,
   bending the unwanted end portion of the rail back and forth at the crimp line while holding the wanted portion of the support rail and the crimp line in a fixed position,
   progressively weakening the rail at said crimp line by continued bending back and forth of the unwanted end portion of the rail at the crimp line, breaking the rail at said crimp line to adjust the length of the rail and to obtain a desired length of rail and a broken-off end portion of rail, and discarding the broken-off end portion of the rail.

3. The method of claim 2, including holding the wanted portion of the rail still with one hand, and manipulating the breaker tool with the other hand to bend the unwanted portion of the rail back and froth until it breaks off at the crimp line.

4. A method of assembling a hanging file frame from a knock-down kit for insertion into a drawer to support hanging files, comprising the steps of providing a hand-held breaker tool, said breaker tool having a longitudinal handle portion, a head portion integral with the handle portion and positioned at one end of the handle portion, and a transverse slot formed in the head portion, providing a side rail having a cross section, said transverse slot in the head portion of the breaker tool being larger than the cross section of the rail, adjusting the length of the rail by retaining a wanted portion of the rail and breaking off an unwanted portion of the rail, breaking off the unwanted end portion of the rail by inserting the unwanted end portion of the rail into the transverse slot in the breaker tool, positioning the transverse slot just outwardly of a desired crimp line of weakness that is to be the end of the rail when it is adjusted as to length, and bending the unwanted end portion of the rail back and forth at the crimp line while holding the wanted portion of the support rail in a fixed position, progressively weakening the rail at said crimp line by continuing to bend back and forth the unwanted end portion of the rail at the crimp line, breaking the rail at said crimp line to adjust the length of the rail and to obtain a desired length of rail and a broken-off end portion of rail, discarding the broken-off end portion of the rail, providing a pair of end frame members with each having a shorter end horizontal member connected to a longer horizontal member by a pair of vertical side wires, selecting a letter size frame by turning the shorter horizontal end member to up position or selecting a legal size frame by turning the longer horizontal end member to up position, placing a plastic corner post having a slot on each end of the upper horizontal end member of each end frame member, gently tapping each of the four corner posts on the floor to insure that they are on the horizontal end member as far as they go into the slots of the posts, placing one of the end frame members on a flat surface and pushing one end of each of the two side rails into the slots in the plastic corner posts as far as they go, placing the other end frame member on a flat surface and pushing the opposite end of each of the side rails into the slots in the corner posts, and inserting the assembled frame into a drawer.

* * * * *